G. J. THOMASSEN.
FLEXIBLE PIPE JOINT.
APPLICATION FILED JULY 9, 1919.
1,344,834.
Patented June 29, 1920.
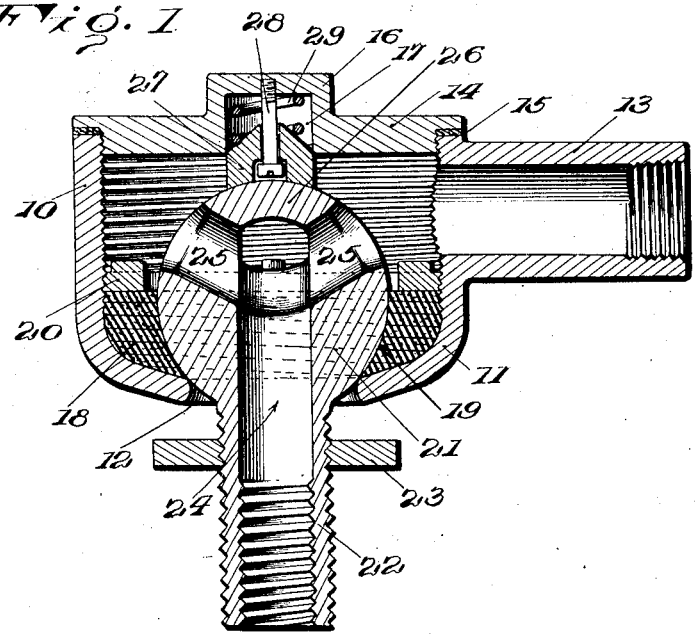
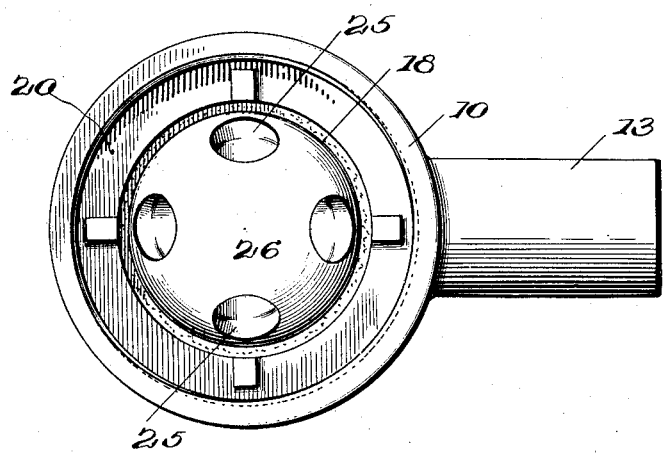
Inventor.
G. J. Thomassen
by Lacy & Lacy,
his, Attorneys.

UNITED STATES PATENT OFFICE.

GOTFRED J. THOMASSEN, OF WEST PHILADELPHIA, PENNSYLVANIA.

FLEXIBLE PIPE-JOINT.

1,344,834.  Specification of Letters Patent.  Patented June 29, 1920.

Application filed July 9, 1919. Serial No. 309,544.

*To all whom it may concern:*

Be it known that I, GOTFRED J. THOMASSEN, citizen of the United States, residing at West Philadelphia, in the county of Philadelphia and State of Pennsylvania, have invented certain new and useful Improvements in Flexible Pipe-Joints, of which the following is a specification.

This invention relates to an improved flexible pipe joint of the ball and socket type and has as one of its principal objects to provide a joint of this character which will form an elbow.

The invention has as a further object to provide a joint wherein the ball employed will be constantly spring pressed against its seat by means acting against the top of the ball.

A further object of the invention is to provide a joint employing an improved type of packing which will form a seat for the ball and wherein said packing may be removed without disconnecting the ball from the socket therefor.

A further object of the invention in this connection is to provide a joint having a packing of such nature that the packing will always conform to the contour of the ball while means will be provided for adjustably feeding the packing against the ball.

And the invention has as a still further object to provide a joint wherein, when desired, the ball may be locked against axial rotation as well as swinging movement within the joint socket.

Other and incidental objects will appear hereinafter. In the drawings:

Figure 1 is a vertical sectional view taken centrally through my improved joint, and Fig. 2 is a plan view of the device, the cap of the joint socket being removed.

In carrying the invention into effect, I employ a preferably cylindrical joint socket 10. This joint socket is formed with a spherically curved bottom wall 11 through which is provided an opening 12 axially of the socket. The cupped inner face of said wall is smooth. Extending from the socket adjacent its upper end is an inlet 13 and closing the upper end of the socket is a closure plate or cap 14. This cap is threaded into the upper end of the socket and is provided with a radial flange overhanging the socket wall. Preferably, a gasket 15 is employed between said flange and the upper edge of the socket wall to provide a sealed joint between the cap and socket. Upstanding from the cap axially thereof is a wrench receiving enlargement 16 which is cored out to provide a recess 17 opening through the inner face of the cap axially of the opening 12.

Removably fitted within the joint socket is a packing 18. This packing is in the nature of a ring to provide a spherically curved ball seat 19 and is preferably formed from a helically wound strip of suitable packing material. At its outer peripheral face the packing snugly engages the cylindrical wall of the joint socket while at its lower end the packing is formed with a spherically curved end face seating flat against the smooth inner face of the bottom wall 11 of the socket. Threaded into the socket to seat against said packing is a follower ring 20 provided with lugs to receive a spanner wrench so that said ring may be adjusted for tightly holding the packing against the bottom wall of the socket and clamping or compressing the helical turns of the packing together.

In connection with the socket 10 I employ a ball 21 snugly engaging the ball seat 19 of the packing 18. This ball may be fitted through the follower ring 20 to coact with said seat and extending from the ball is a tubular discharge stem 22 which is freely received through the opening 12 in the bottom wall 11 of the socket. The outer end portion of the stem is internally threaded for connection to a suitable pipe while the stem is externally threaded throughout its length to receive a locking nut 23. Communicating with the stem is a discharge passage 24 extending partially through the ball, and opening into the upper end of this passage is a series of branch passages 25 spaced, as particularly shown in Fig. 2, circumferentially of the ball and inclining upwardly and outwardly from the passage 24 to communicate through the socket with the inlet 13. The branch passages thus define an unbroken web 26 at the top of the ball and coacting with this web is a follower 27 slidably received within the recess 17 of the cap 14. The follower is provided with a curved lower end face conforming to the curvature of the ball and freely fitted through the follower is a cap screw 28 slidably connecting the follower with the cap. Surrounding said screw within the recess is a spring 29 bearing between the enlargement 16 and the follower and acting to constantly urge the ball into engagement with its seat. Thus, the ball will be resiliently held in close frictional engagement with the ball seat to provide a sealed joint between the ball and socket. However, the ball may, nevertheless, be readily swung or rotated about its axis. Furthermore, it will be observed that since the discharge stem 22 of the ball stands in angular relation to the inlet 13, the joint will provide an elbow.

Particular attention is now directed to the fact that by positioning the follower 20 downwardly within the socket, the packing 18 may be adjustably fed into coacting relation with the ball or, in other words, the ball seat of the packing may be contracted and in this connection one of the functions attendant upon the peculiar construction of the packing becomes apparent. It will be noted that as the follower is adjusted downwardly within the socket, the lower turns of the strip forming the packing will be fed to the ball in a degree increasing with each succeeding turn. This, of course, will be caused by the curvature of the bottom wall 11 of the socket and the inner face of said bottom wall is, as previously indicated, smooth, so that the packing may readily ride thereagainst. Consequently, it will be seen that a graduated feeding of the turns of the packing strip is had so that as the outer face of the lower hemispherical portion of the ball curves away from the packing, the packing will be fed in proportionately increasing degree against said face to coact therewith. A constantly sealed joint between the ball and socket will thus be insured. Furthermore, it is to be observed that owing to the downwardly increasing feeding action had upon the lower turns of the packing, the lower turns of the packing will coact with the ball for wedging or lifting the ball upwardly against the tension of the spring 29 upon the follower 27. Thus, as the packing is adjustably fed into contacting relation with the ball, the tension of the spring upon the ball, acting to hold the ball in engagement with its seat, will also be adjustably increased and, as will be observed, both adjustments are simultaneously had by operating the one follower 20. In this connection it is to be noted that the packing is of a thickness to surround the lower hemispherical portion of the ball only so that normally, the outer or upper ends of the branch passages 25 will lie in a plane above the packing in open communication with the inlet 13.

To renew the packing 18, it is simply necessary to displace the cap 14 when, after removing the follower 21, the packing strip may be unwound from around the ball and a new packing strip substituted therefor. Thus, it will be seen that the packing may be renewed without disconnecting the joint from the pipes with which it is engaged. When renewing the packing it may prove desirable to hold the ball stationary with respect to the socket. The nut 23 is accordingly provided. By threading this nut upwardly upon the ball stem 22 into engagement with the bottom wall of the socket, the ball may not only be locked against swinging movement but may also be clamped against axial rotation. When the ball is so locked, upward thrust thereon cannot serve to strain the stem 22 or project the ball upwardly through the socket. Should it be desired to remove the ball from the socket, the ball may, after having been freed, be simply lifted upwardly through the socket by removing the cap 14. As will be seen, this operation will not require the disconnection of the socket from the pipes with which it is engaged.

Having thus described the invention, what is claimed as new is:

1. A flexible pipe joint including a socket provided with a closure cap, a ball mounted within the socket, a spring pressed follower acting against the peripheral surface of the ball, and means housed by the cap securing the follower thereto.

2. A flexible pipe joint including a socket, a closure therefor, a packing within the socket providing a ball seat, a follower for said packing, and a ball mounted within the socket to coact with said seat, the ball being removable through the follower.

3. A flexible pipe joint including a socket, a packing therein providing a ball seat, a ball coacting with said seat, a spring pressed follower acting against the ball for holding the ball in engagement with the seat, and means adjustable within the socket to coact with the packing for contracting the ball seat and shifting the ball toward the follower whereby to increase the spring tension of the follower against the ball.

4. A flexible pipe joint including a socket, a ball mounted therein and provided with a stem, and means adjustable upon the stem to coact with the socket for locking the ball against axial and swinging movement with respect to the socket.

5. A flexible pipe joint including a socket, a cap closing the outer end of the socket, a ball arranged within the socket and having a stem projecting freely through the inner end of the socket, and a packing arranged within the socket to fit the ball bearing between the socket and the ball beyond the equatorial plane of the ball, the packing being removable without displacing the ball.

6. A flexible pipe joint including a socket, a ball arranged within the socket, and a packing fitting the surface of the ball within the socket at one side of the equatorial plane of the ball and removable across said plane without displacing the ball.

7. In a flexible pipe joint, the combination of a socket, a ball arranged within the socket, and a packing bearing between the ball and socket at one side of the equatorial plane of the ball, the packing being formed from a helically wound strip whereby the packing may be removed across said plane without displacing the ball.

8. A flexible pipe joint including a socket, a ball arranged within the socket and provided with a hollow stem, the ball being formed with a laterally directed passage communicating with said stem and opening through the peripheral surface of the ball at one side of the equatorial plane thereof, a packing bearing between the ball and socket at the opposite side of the equatorial plane of the ball, and a follower coacting with the ball normally in alinement with said stem.

9. A flexible pipe joint including a socket, a ball mounted therein, a closure for the socket provided with a recess, and a spring pressed follower for the ball slidable in said recess to coact with the ball.

10. A flexible pipe joint including a socket, a ball mounted therein, a closure for the socket provided with a recess, a follower slidable in said recess, means extending through the follower and slidably connecting the follower with the closure, and a spring housed within the recess to act against the follower urging the follower into engagement with the ball.

In testimony whereof I affix my signature.

GOTFRED J. THOMASSEN. [L. S.]